(12) United States Patent
Choi

(10) Patent No.: US 11,057,570 B2
(45) Date of Patent: Jul. 6, 2021

(54) VEHICLE AND METHOD FOR CONTROLLING THE SAME

(71) Applicants: Hyundai Motor Company, Seoul (KR); Kia Motors Corporation, Seoul (KR)

(72) Inventor: Jinwook Choi, Goyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/243,508

(22) Filed: Jan. 9, 2019

(65) Prior Publication Data
US 2020/0120255 A1 Apr. 16, 2020

(30) Foreign Application Priority Data

Oct. 15, 2018 (KR) .......................... 10-2018-0122300

(51) Int. Cl.
| | |
|---|---|
| *H04N 5/235* | (2006.01) |
| *H04N 5/247* | (2006.01) |
| *H04N 5/232* | (2006.01) |
| *B60R 1/00* | (2006.01) |

(52) U.S. Cl.
CPC ............ *H04N 5/2353* (2013.01); *B60R 1/00* (2013.01); *H04N 5/23216* (2013.01); *H04N 5/247* (2013.01); *B60R 2300/105* (2013.01)

(58) Field of Classification Search
None
See application file for complete search history.

(56) References Cited

U.S. PATENT DOCUMENTS

| | | | |
|---|---|---|---|
| 4,423,936 A | 1/1984 | Johnson | |
| 5,592,256 A | 1/1997 | Muramatsu | |
| 6,636,646 B1 | 10/2003 | Gindele | |
| 7,289,154 B2 | 10/2007 | Gindele | |
| 2012/0002050 A1* | 1/2012 | Taniguchi | H04N 7/181 348/148 |
| 2017/0078551 A1 | 3/2017 | Kweon et al. | |
| 2017/0212408 A1* | 7/2017 | Ma | H04N 5/23296 |
| 2018/0115694 A1 | 4/2018 | Choi et al. | |
| 2019/0052800 A1* | 2/2019 | Govindarao | H04N 5/247 |

FOREIGN PATENT DOCUMENTS

| | | |
|---|---|---|
| EP | 0544804 B1 | 4/1996 |
| EP | 0596416 B1 | 2/1999 |
| KR | 101679279 B1 | 11/2016 |
| KR | 101816449 B1 | 1/2018 |

* cited by examiner

*Primary Examiner* — Christopher Braniff
(74) *Attorney, Agent, or Firm* — Slater Matsil, LLP

(57) ABSTRACT

A vehicle includes at least one camera configured to obtain images around the vehicle, a display configured to display an output image based on the images around the vehicle, an inputter configured to receive a user's command, and a controller configured to determine a display mode of the output image based on the user's command and change an exposure value of the camera based on brightness information of a predetermined area corresponding to the display mode.

20 Claims, 14 Drawing Sheets

Z1

VEHICLE AND METHOD FOR CONTROLLING THE SAME

CROSS-REFERENCE TO RELATED APPLICATIONS

This application claims priority to Korean Patent Application No. 10-2018-0122300, filed in the Korean Intellectual Property Office on Oct. 15, 2018, which application is hereby incorporated herein by reference.

TECHNICAL FIELD

Embodiments of the present disclosure relate to a vehicle for providing an image around the vehicle, and a method for controlling the same.

BACKGROUND

A camera provided in a conventional vehicle determines an exposure value based on an entire image when obtaining an image around the vehicle.

In recent years, the number of cameras in vehicles has increased, and the number of view modes supported thereby has been increasing.

For example, a surround view monitor (SVM) top view monitoring system uses four cameras, one at the front and the rear of the vehicle and one at the bottom of the left and right side mirrors, to generate a top view screen on a navigation screen as if it was taken from the top of the vehicle. Using the SVM top view monitoring system, a driver may grasp the situation around the vehicle at a glance, park securely, or drive down a narrow path.

However, when using a conventional exposure control method to derive such images, it may be difficult for the driver to accurately grasp the desired location. In particular, when the driver intends to grasp a right side, it is difficult to recognize the specific situation of the right side of the vehicle because the right side image is obtained in an excessively bright or dark state by obtaining the image entirely by metering light.

In addition, an area used for image processing in the image around the vehicle obtained through the camera varies in each display mode. However, when the exposure value is determined for the entire image, consideration is not given to an important area used for image processing, thus dark or bright images may be outputted more than necessary.

SUMMARY

Embodiments of the present disclosure provide a vehicle capable of clearly grasping the environment around the vehicle by determining an exposure value of a camera in accordance with a user's intention and providing an image obtained with the determined exposure value to the user, and a method for controlling the same.

Additional aspects of the disclosure will be set forth in part in the description which follows and, in part, will be obvious from the description, or may be learned by practice of the disclosure.

In accordance with an aspect of the present disclosure, a vehicle includes at least one camera configured to obtain images around the vehicle. A display is configured to display an output image based on the images around the vehicle. An inputter is configured to receive a user's command. A controller is configured to determine a display mode of the output image based on the user's command and to change an exposure value of the camera based on brightness information of a predetermined area corresponding to the display mode.

The controller may determine the predetermined area in the images around the vehicle based on the display mode.

The controller may determine at least one image among the images around the vehicle obtained by a plurality of the cameras as the predetermined area to change an exposure value of the plurality of cameras.

The controller may apply the exposure value of a reference camera that has obtained the predetermined area among the plurality of cameras to another camera.

The controller may change the exposure value of the camera based on the brightness information of an area of interest determined by the user's command.

The controller may generate a plurality of output images based on the images around the vehicle, determine a reference output image among the plurality of output images based on a predetermined priority, and change the exposure value of the camera based on the brightness information of the predetermined area corresponding to the reference output image.

The vehicle may further include a sensing device configured to obtain state information of the vehicle. The controller may determine the display mode of the output image based on the user's command and the state information of the vehicle.

In accordance with another aspect of the present disclosure, a method for controlling a vehicle includes obtaining images around the vehicle; receiving a user's command, determining a display mode of an output image based on the user's command, and changing an exposure value of a camera based on brightness information of a predetermined area corresponding to the display mode.

The changing of the exposure value of the camera may include determining the predetermined area in the images around the vehicle based on the display mode.

The changing of the exposure value of the camera may include determining at least one image among the images around the vehicle obtained by a plurality of the cameras as the predetermined area to change an exposure value of the plurality of cameras.

The changing of the exposure value of the camera may include applying the exposure value of a reference camera that has obtained the predetermined area among the plurality of cameras to another camera.

The changing of the exposure value of the camera may include changing the exposure value of the camera based on the brightness information of an area of interest determined by the user's command.

The method may further include generating a plurality of output images based on the images around the vehicle. The changing of the exposure value of the camera may include determining a reference output image among the plurality of output images based on a predetermined priority, and changing the exposure value of the camera based on the brightness information of the predetermined area corresponding to the reference output image.

The method may further include obtaining state information of the vehicle. The changing of the exposure value of the camera may include determining the display mode of the output image based on the user's command and the state information of the vehicle.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION OF ILLUSTRATIVE EMBODIMENTS

Figure 1:
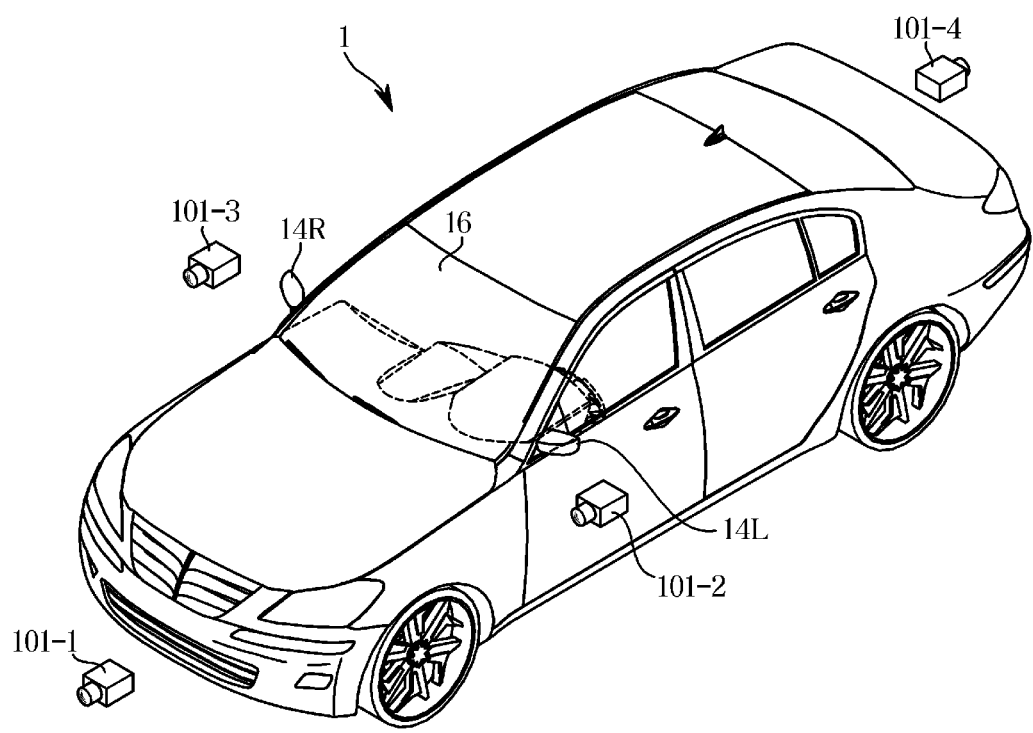
FIG. 1 is a view illustrating an appearance of a vehicle according to an embodiment.

Like reference numerals refer to like elements throughout the specification. Not all elements of the embodiments of the present disclosure will be described, and the description of what are commonly known in the art or what overlap each other in the embodiments will be omitted. The terms as used throughout the specification, such as "~ part," "~ module," "~ member," "~ block," etc., may be implemented in software and/or hardware, and a plurality of "~ parts," "~ modules," "~ members," or "~ blocks" may be implemented in a single element, or a single "~ part," "~ module," "~ member," or "~ block" may include a plurality of elements.

It will be further understood that the term "connect" and its derivatives refer both to direct and indirect connection, and the indirect connection includes a connection over a wireless communication network.

The term "include (or including)" and "comprise (or comprising)" are inclusive or open-ended and do not exclude additional, unrecited elements or method steps, unless otherwise mentioned.

It will be further understood that the term "member" and its derivatives refer both to when a member is in contact with another member and when another member exists between the two members.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are merely used for convenience of explanation, but not to limit an order of the steps. Thus, unless the context clearly dictates otherwise, the written order may be practiced otherwise.

Hereinafter, an operation principle and embodiments of the present disclosure will be described with reference to accompanying drawings.

FIG. 1 is a view illustrating an appearance of a vehicle according to an embodiment.

Referring to FIG. 1, an appearance of a vehicle 1 may include wheels 12 and 13 for moving the vehicle 1, doors 15L and 15R for shielding the interior of the vehicle 1 from the outside, a front window 16 providing a view ahead of the vehicle 1, and side mirrors 14L and 14R providing a view of areas behind and to the sides of the vehicle 1.

The wheels 12 and 13 may include the front wheels 12 disposed in a front portion of the vehicle 1 and the rear wheels 13 disposed in a rear portion of the vehicle 1, and a driving system (not shown) may be arranged inside the vehicle 1 for providing a rotational force to the front wheels 12 or the rear wheels 13 to move the vehicle 1 forward or backward. The driving system may employ a motor that produces the rotational force from electrical power supplied from a storage battery, or a combustion engine that burns a fuel to create the rotational force.

The doors 15L and 15R are pivotally attached onto the left and right sides of the vehicle 1, and opened to provide access into the vehicle 1 and closed for shielding the interior of the vehicle 1 from the outside. Handles 17L and 17R may be mounted on the outer surface of the vehicle 1 to open or close the doors 15L and 15R. An LF antenna (not shown) capable of transmitting a low frequency (LF) signal may be mounted on the handles 17L and 17R.

The front window 16 is mounted on the upper front part of the main body to provide views ahead of the vehicle 1.

The side mirrors 14L and 14R include the left side mirror 14L and the right side mirror 14R disposed on the left and right sides of the vehicle 1, respectively, for providing views behind and to the sides of the vehicle 1.

In addition, the vehicle 1 may include a sensor configured to sense an obstruction or other vehicles behind or to the sides of the vehicle 1 (e.g., subject vehicle). The sensor may include a sensing device, such as an approximation sensor and a rainfall sensor configured to sense precipitation and whether it is raining, etc.

A proximity sensor may be configured to transmit sensing signals from the side or rear of the vehicle 1 and receive a reflection signal reflected from an obstruction or another vehicle. Based on the waveform of the received reflection signal, a controller of the vehicle 1 may be configured to determine whether there is another vehicle or obstruction behind and to the sides of the vehicle 1 and where the vehicle or obstruction is located. For example, the proximity sensor may be configured to sense a distance to the obstruction by irradiating ultrasound or infrared rays and receiving the reflected ultrasound or infrared rays from the obstacles.

The vehicle may also include an image obtaining device 100 including cameras 101-1, 101-2, 101-3, and 101-4. The cameras 101-1, 101-2, 101-3, and 101-4 that constitute the image obtaining device 100 and obtain an image around the vehicle may be provided on the front, rear, and side of the vehicle to obtain images, and the images obtained by the cameras 101-1, 101-2, 101-3, and 101-4 may be derived as the image around the vehicle by a method described later.

Figure 2:
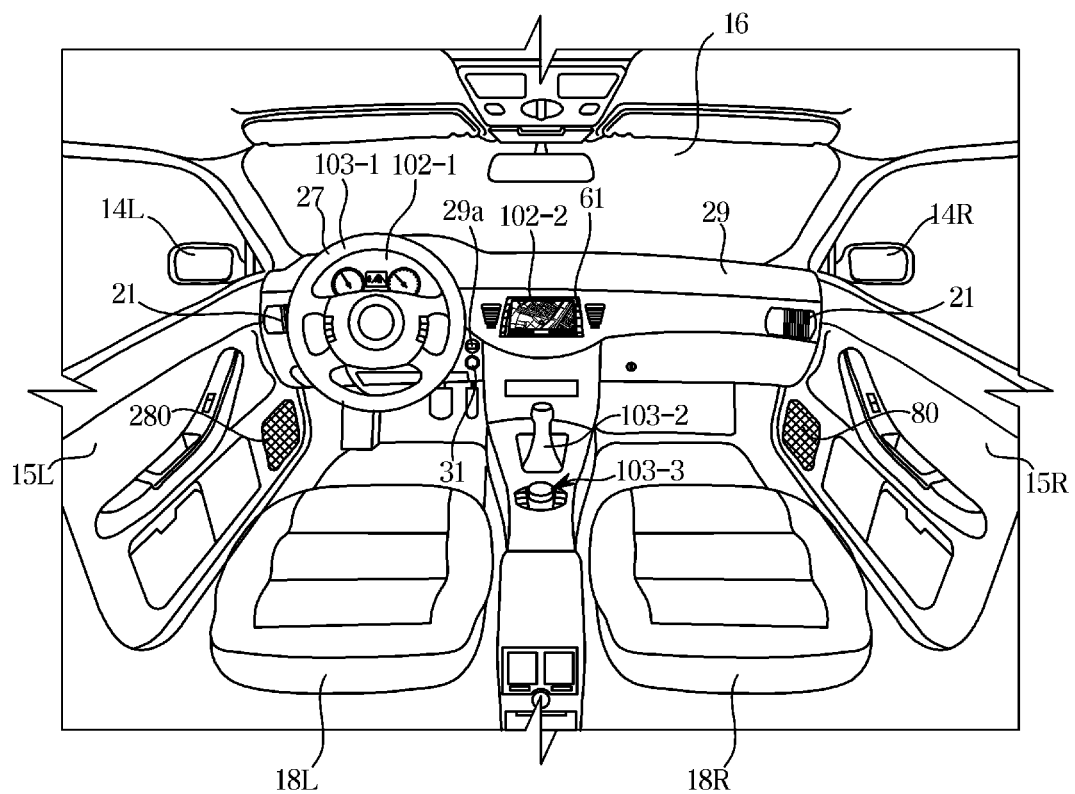
FIG. 2 is a view illustrating an internal configuration of a vehicle according to an embodiment.

FIG. 2 is a view illustrating an internal configuration of a vehicle according to an embodiment.

Referring to FIG. 2, in the center area of a dashboard 29, an Audio Video Navigation (AVN) display 102-2 and an AVN inputter 61 may be provided. The AVN display 102-2 may be configured to selectively display at least one of audio, video, and navigation screens, and in addition, display various control screens related to the vehicle 1 or screens related to additional functions.

The AVN display 102-2 may be implemented with liquid crystal displays (LCDs), light emitting diodes (LEDs), plasma display panels (PDPs), organic light emitting diodes (OLEDs), cathode ray tubes (CRTs), or the like.

The AVN inputter 61 may be provided in a hard key type in the area adjacent to the AVN display 102-2 or may be provided in the form of a touch panel on the front of the AVN display 102-2 when the AVN display 102-2 is implemented as a touch screen type.

Furthermore, a center inputter 103-2 of a jog shuttle type may be mounted between a driver's seat 18L and a passenger seat 18R. A user may input a control command by turning or pressing (or otherwise engaging) a center inputter 103-3 or pushing the center inputter 103-3 to the left, right, up or down (e.g., manipulating the unit).

A sound output 80 configured to output sound may be mounted inside the vehicle 1. The sound output 80 may be a speaker. The sound output 80 may be configured to output sound required in performing audio, video, navigation, and other additional functions.

A steering wheel 103-1 may be provided on the dashboard 29 in front of the driver's seat 18L, and a key hole 29a may be formed in an area near the steering wheel 103-1.

Furthermore, an ignition button 31 may be disposed on the dashboard 29 to start/stop the engine of the vehicle 1. When a smart key 200 is inserted into the key hole 29a or the authentication between the smart key 200 and the vehicle 1 is successful through a wireless communication network, the ignition of the vehicle 1 may be turned on by pressing the ignition button 31 of the user.

Meanwhile, the vehicle 1 may also include an air conditioner configured to perform heating or cooling and release heated or cooled air through air vents 21 to control the temperature inside the vehicle 1.

Figure 3:
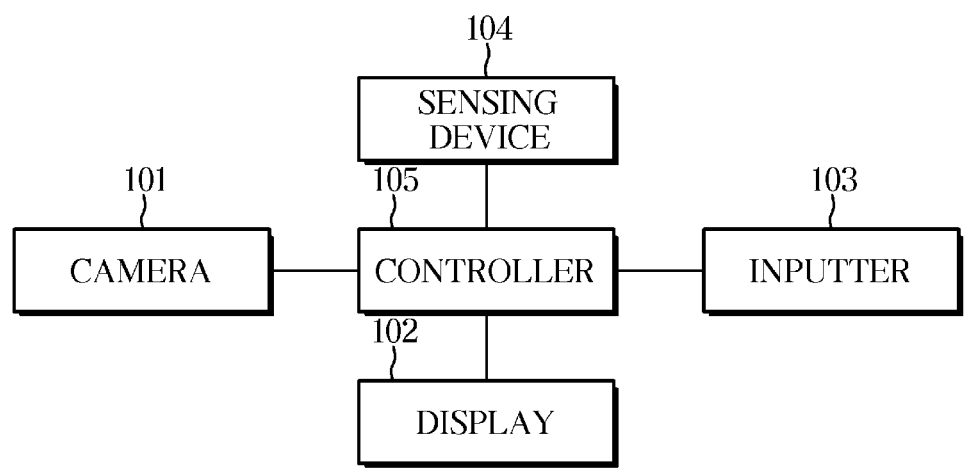
FIG. 3 is a control block diagram of a vehicle according to an embodiment.

FIG. 3 is a control block diagram of a vehicle according to an embodiment.

Referring to FIG. 3, the vehicle 1 may include a camera 101, a display 102, an inputter 103, a sensing device 104, and a controller 105.

The camera 101 may obtain images around the vehicle 1. The vehicle 1 may be provided with at least one camera.

The camera 101 may capture the front, side, and rear images of the vehicle 1 and transmit the captured images to the controller 105. According to the embodiment, the camera 101 may be provided in the side mirrors 14L and 14R provided in the vehicle 1 to obtain images around the vehicle 1.

The camera 101 installed in the vehicle 1 may include a charge-coupled device (CCD) camera or a CMOS color image sensor. Here, both the CCD and the CMOS refer to a sensor that converts light received through the lens of the camera 101 into an electric signal and stores the electric signal. In particular, the CCD camera 101 may be a device that converts the image into the electric signal using the charge-coupled device. Also, the CMOS Image Sensor (CIS) may refer to a low-consumption, low-power type image pickup device having a CMOS structure and perform as an electronic film of a digital device. In general, the CCD is more sensitive than the CIS and may be used in the vehicle 1, but is not necessarily limited thereto.

The display 102 may display an output image based on the image around the vehicle 1. The image around the vehicle 1 may be an original image obtained by the camera, and the output image may be the image around the vehicle 1, which is processed and output.

The display 102 may include cathode ray tubes (CRTs), a digital light processing (DLP) panel, a plasma display panel (PDP), a liquid crystal display (LCD) panel, an electro luminescence (EL) panel, an electrophoretic display (EPD) panel, an electrochromic display (ECD) panel, a light emitting diode (LED) panel or an organic light emitting diode (OLED) panel, but is not limited thereto.

The inputter 103 may receive the user's commands. The user's commands may include direct commands to control the output image, and in addition, commands to change the vehicle speed by stepping on the pedal, gear shift commands, and the like.

The inputter 103 may be a hardware device such as a button, a switch, a pedal, a keyboard, a mouse, a track-ball, various levers, a handle, a stick, and the like.

In addition, the inputter 103 may include a GUI (Graphical User Interface) such as a touch pad or the like for software input. The touch pad may be implemented as a touch screen panel (TSP) to form a mutual layer structure with the display 102.

In the case of the touch screen panel (TSP) having the touch pad and the mutual layer structure, the display 102 may be used as the inputter 103 as well.

The sensing device 104 may obtain the state information of the vehicle 1.

The sensing device 104 may include a yaw rate sensor, a steering angle sensor, a braking pressure sensor, an acceleration sensor, and a wheel speed sensor.

The yaw rate sensor may include a sensor for measuring the amount of change in a rotational angle around a vertical line passing through the center of the vehicle 1.

The steering angle sensor may refer to a sensor that may actually obtain the angle at which the tire rotates with respect to the angle of the steering wheel of the vehicle 1, and may be provided in the electric steering system.

The wheel speed sensor may be disposed on each of the front and rear wheels to detect rotation speeds of the wheels by the tone wheel and the change of magnetic line on the sensor. The wheel speed sensor may be provided in the vehicle electronic stability control (ESC) system.

The braking pressure sensor may be provided as a sensor capable of measuring the braking pressure of a brake.

The acceleration sensor may measure a longitudinal speed, a lateral acceleration, and a vertical acceleration of the vehicle 1. According to the embodiment, the acceleration sensor may be implemented as a gyro sensor.

The controller 105 may determine a display mode of the output image based on the user's command. In particular, the display mode may include an SVM top view, a blind-spot view monitor (BVM) view, a rear BVM simulated view, a rear base view, a rear wide view, a front fender view, a foreground view for recognition, and a rear mirror view.

For example, the corresponding BVM view may be output to the cluster according to a turning direction when a turn signal is operated during driving of the vehicle 1. Details related to this will be described later.

The controller 105 may change the exposure value of the camera 101 based on brightness information of a predetermined area corresponding to the display mode. Meanwhile, the predetermined area may be predetermined so as to correspond to the corresponding display mode.

For example, when the display mode is the top view, the predetermined area may be determined so as to secure a viewing amount of 3.5 m on the left and right sides and 2.5 m on the front and rear with reference to the vehicle 1 in the front, rear, left and right images of the SVM.

According to another embodiment, when the display mode is the BVM view, an area in which the backward-facing vehicle 1 or the like can be identified in the SVM left and right original images and an area in which the viewing amount of the vehicle 1 is predetermined may be determined as the predetermined area.

The camera exposure may refer to an operation of examining the most suitable amount of light when obtaining the image around the vehicle 1.

According to the embodiment, the optimized ISO sensitivity or a certain amount of light should be inspected on the CCD and CMOS. The controller 105 may adjust the aperture size and the shutter speed according to the brightness of the image around the vehicle 1, and adjust the exposure in combination of the two.

Meanwhile, the controller 105 may determine the predetermined area on the image around the vehicle 1 based on the display mode. In particular, the predetermined area may be a reference for determining the exposure amount of the camera provided in the vehicle 1. The predetermined area may determine the exposure value of the camera based on the image obtained by one of the cameras determined based on the display mode, or a part of the image obtained by the camera.

That is, the controller 105 may determine at least one image of the images around the vehicle 1 obtained by the plurality of cameras as the predetermined area, change the exposure values of the plurality of cameras and control the exposure value of the reference camera that has obtained the determined area among the plurality of cameras to be applied to another camera.

The controller 105 may change the exposure value of the camera based on the brightness information of an area of interest determined based on the user's command.

In addition to the indirect commands, the user may directly select the area of interest. The controller 105 may adjust the exposure amount of at least one of the cameras based on the brightness of the image of the area of interest directly selected by the user.

The controller 105 may generate a plurality of output images based on the images around the vehicle 1.

For example, the controller 105 may control the display 102 to output the rear view of the SVM view output to the display 102.

In this case, the controller 105 may determine a reference output image from among the plurality of output images based on a predetermined priority and change the exposure value of the camera based on the brightness information of the predetermined area corresponding to the reference output image.

For example, when the SVM view and the rear view are simultaneously output as described above, the controller 105 may determine that the view that the user mainly looks at is the rear view, assign a high priority to the rear view, and determine the exposure value based on the rear view to obtain the images around the vehicle 1 used in the SVM view.

The controller 105 may determine the display mode of the output image based on the user's command and the state information of the vehicle 1. The controller 105 may output another image to the display 102 based on the speed of the vehicle 1.

The controller 105 may be implemented with a memory (not shown) storing an algorithm to control operation of the components in the vehicle 1 or data about a program that implements the algorithm, and a processor (not shown) carrying out the aforementioned operation using the data stored in the memory. The memory and the processor may be implemented in separate chips. Alternatively, the memory and the processor may be implemented in a single chip.

At least one component may be added or deleted corresponding to the performance of the components of the vehicle 1 illustrated in FIG. 3. It will be readily understood by those skilled in the art that the mutual position of the components may be changed corresponding to the performance or structure of the vehicle 1.

In the meantime, each of the components shown in FIG. 3 may be referred to as a hardware component such as software and/or a field programmable gate array (FPGA) and an application specific integrated circuit (ASIC).

Figure 4:
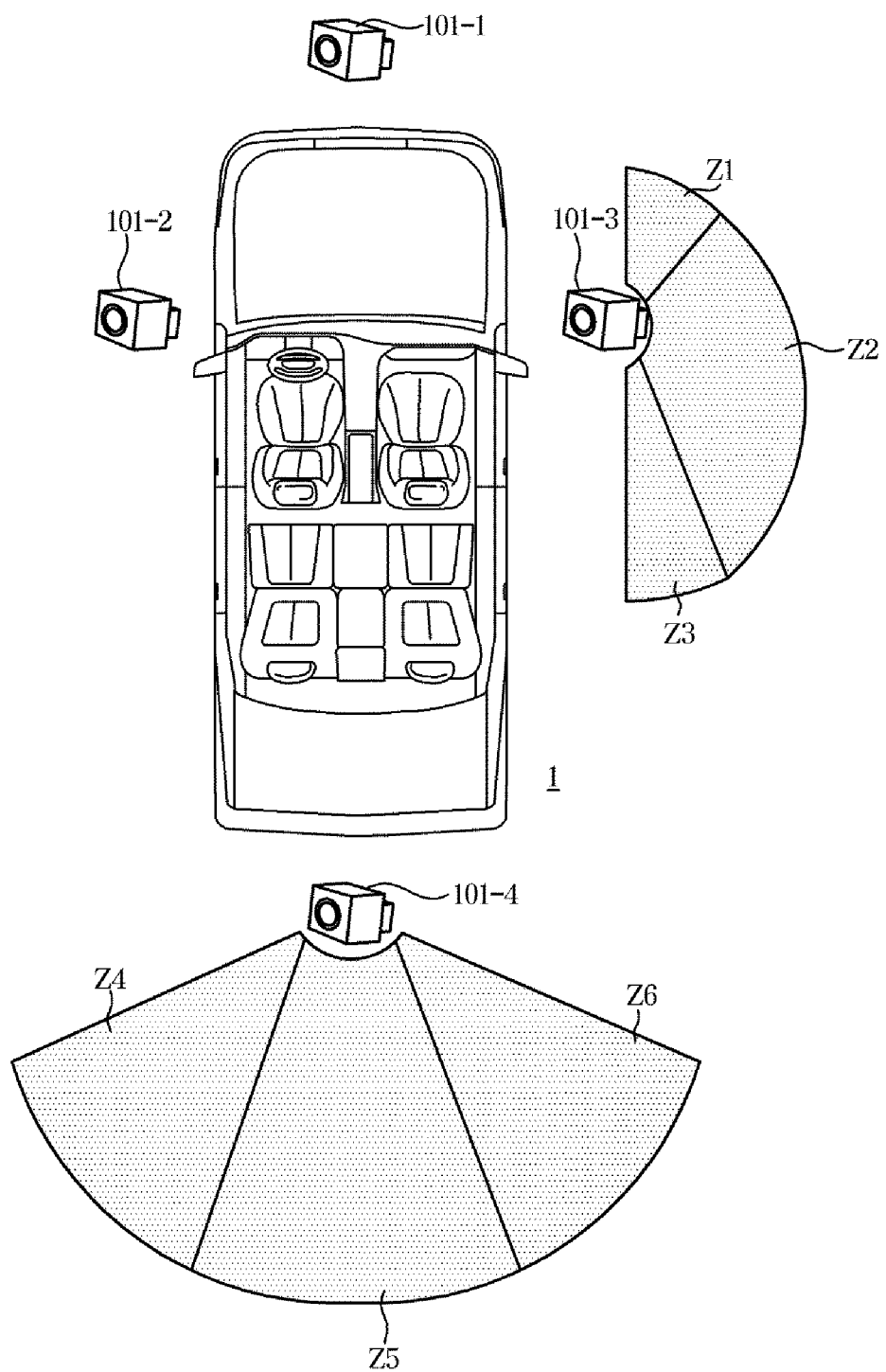
FIG. 4 is a view illustrating each camera according to an embodiment.

FIG. 4 is a view illustrating each camera according to an embodiment.

Referring to FIG. 4, the vehicle 1 may be provided with a plurality of the cameras 101-1, 101-2, 101-3, and 101-4 to display the view of each camera. In FIG. 4, the field of view of the camera 101-3 provided on the right side and the camera 101-4 provided on the rear side with respect to the vehicle 1 are shown, but this is merely an example for illustrating the operation of the present disclosure.

Figure 5:
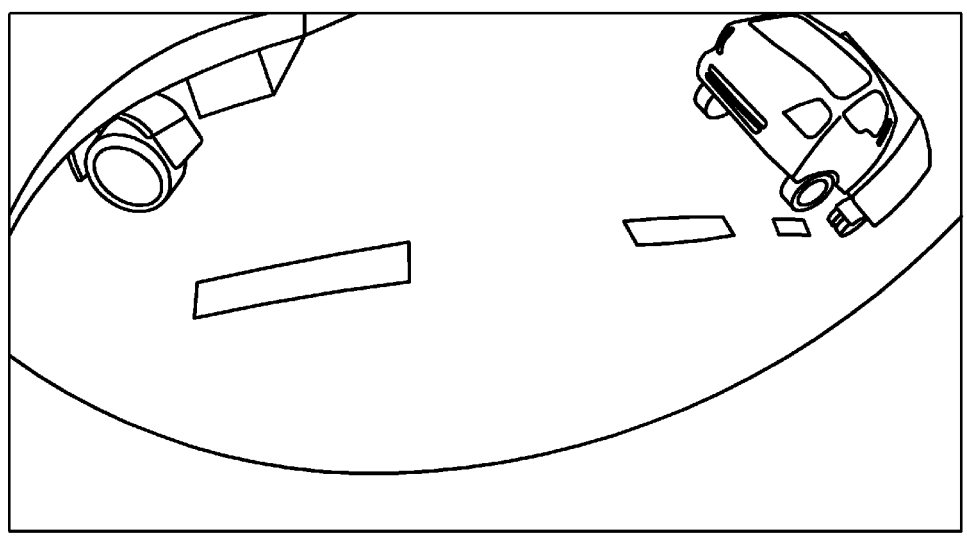
FIGS. 5 to 7 are views illustrating a predetermined area based on a user's command according to an embodiment.
Figure 6:
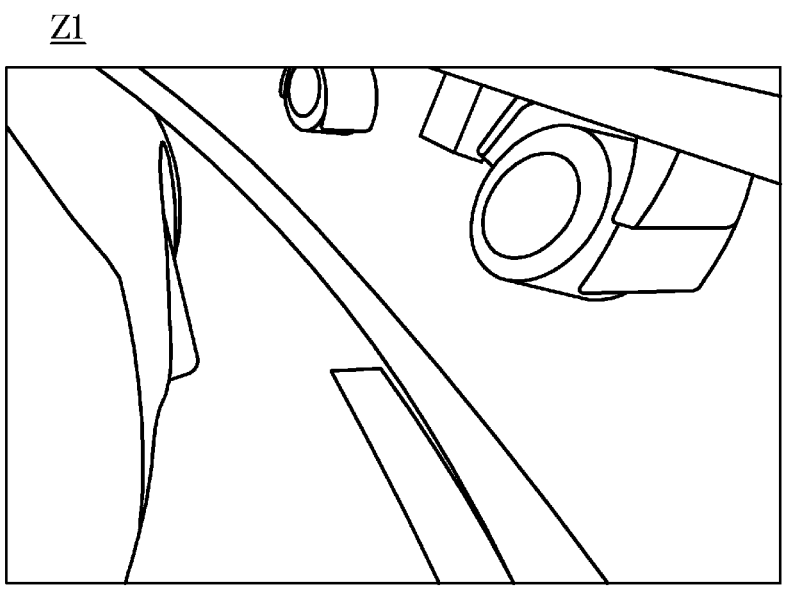
Figure 7:
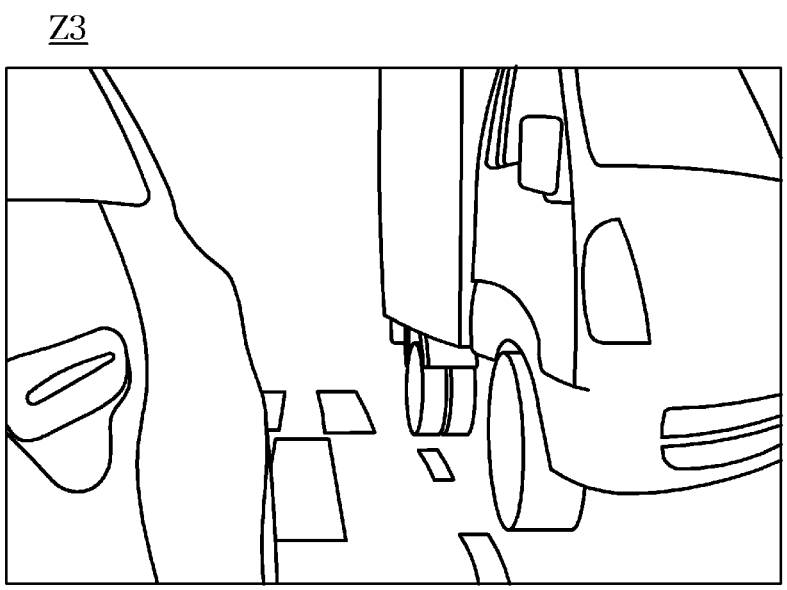

FIGS. 5 to 7 are views illustrating a predetermined area based on a user's command according to an embodiment.

Referring to FIGS. 4 and 5, an image Z2 around the vehicle 1 obtained by the right camera is shown. The controller 105 may determine the forward fender view and the BVM view output to the display 102 as the output image based on the image around the vehicle 1 obtained by the right camera.

Referring to FIGS. 4 to 6, the controller 105 may output the forward fender view to the display 102 when the user inputs a command to proceed to the right at a low speed, such as turning on the right turn signal lamp or turning the handle to the right through the inputter 103.

In this case, the controller 105 can determine the exposure value of the camera provided in the vehicle 1 based on the area of a Z1 portion of the Z2 image obtained by the right camera as the predetermined area. In the case of FIG. 6, when the brightness of the Z1 portion is brighter than the brightness of the Z2 portion, the area to be observed by the user corresponds to the Z1, so that the Z2 may be obtained as the image with a brightness lower than the Z1.

Referring to FIGS. 4, 5, and 7, the controller 105 may output the BVM view on the right side to the display 102 when the user inputs a command such as turning the handle to the right through the inputter 103 and inputting the reverse gear or the like.

In this case, the controller 105 may determine the amount of exposure of the camera provided in the vehicle 1 based on the area of a Z3 portion of the Z2 image obtained by the right camera as the predetermined area. In the case of FIG. 7, when the brightness of the Z3 portion is brighter than the brightness of the Z2 portion, the area to be observed by the user corresponds to Z3, so that Z2 may be obtained as the image with a brightness lower than Z3.

The controller 105 may output the image of the SVM top view to the display 102 in the above-described situation. The controller 105 may determine that the user's command is a command for observing Z1 or Z3 on the right side and may determine the exposure value of another camera based on the exposure value for the corresponding area. The controller 105 may derive the image of the SVM top view by image processing the image around the vehicle 1 by each of the cameras.

According to another embodiment, the corresponding BVM view Z3 may be output to the display 102 according to the direction when the turn signal is operated during driving.

The controller 105 may also control the rear view during driving to be displayed on the display 102 when the button of the SVM view output is pressed when the vehicle 1 is below a predetermined speed (e.g., 15 kph or 10 mph).

According to another embodiment, when the user inputs the reverse gear, the SVM top view and the rear view may be simultaneously output to the AVN during entry. Meanwhile, there is no limitation on the display mode to be output to the display 102 based on the input command, and it is possible to determine an exposure value of the predetermined area based on the display mode and apply the corresponding exposure value to another camera.

FIGS. 8 to 11 are views for explaining an operation of changing the exposure amount of a camera based on an area of interest determined by a user according to an embodiment.

Figure 8:
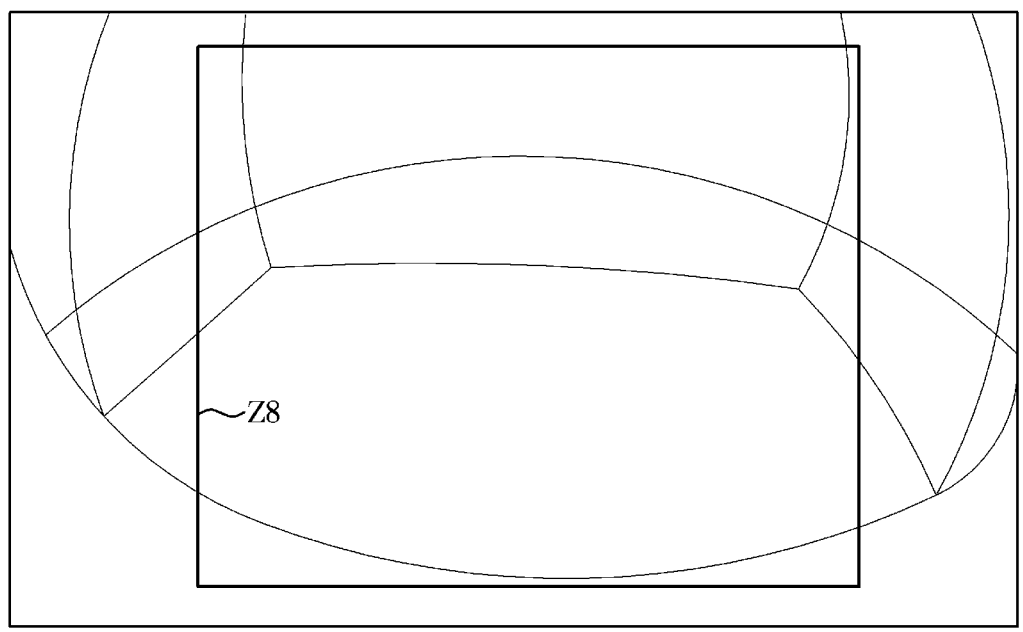
FIGS. 8 to 11 are views for explaining an operation of changing the exposure amount of a camera based on an area of interest determined by a user according to an embodiment.

Referring to FIGS. 4 and 8, the image around the vehicle 1 obtained by the camera 101-4 provided on the rear side of the vehicle 1 is illustrated.

Referring to FIG. 8, the user sets a Z8 area as the area of interest, and the controller 105 may determine the exposure value of the camera based on the brightness of the Z8 area. According to the embodiment, Z8 area may be determined so as to show a width of the vehicle 1 including the bumper of the vehicle 1 in the original image of the rear camera in one rear view.

Figure 9:
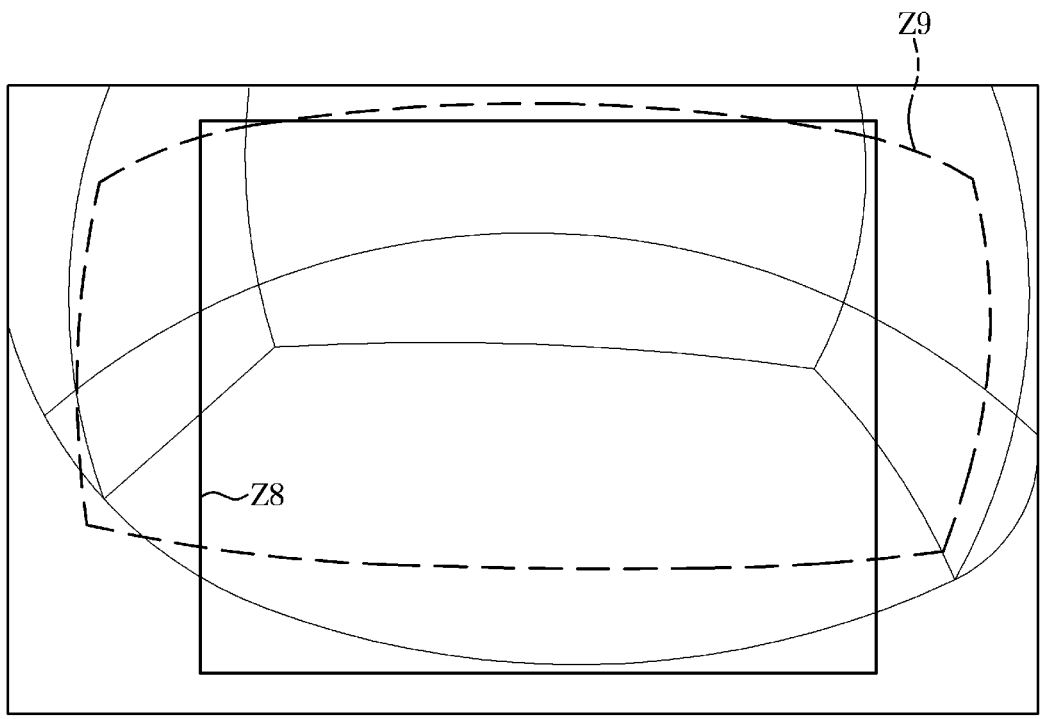

Referring to FIG. 9, the user sets a Z9 area as the area of interest, and the controller 105 may determine the exposure value of the camera based on the brightness of the Z9 area. According to the embodiment, the viewing amount may be further secured so that Z9 area can be checked to the side lane with a width equal to or greater than the width of the vehicle in the general rear view illustrated in FIG. 8. Therefore, the reference exposure value may be determined differently even for the image around the vehicle 1 obtained by the same rear camera 101-4. In particular, the Z9 area may be determined to be the area having a height smaller than that of the Z8 area but a larger width.

Figure 10:
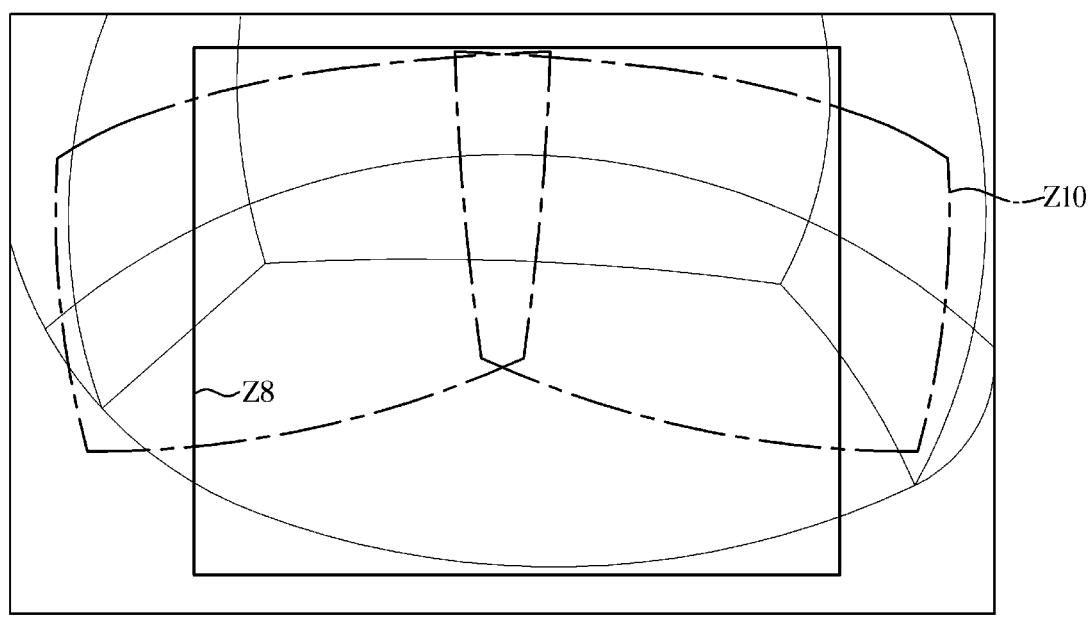

Referring to FIG. 10, the user sets a Z10 area as the area of interest, and the controller 105 may determine the exposure value of the camera based on the brightness of the Z10 area. According to the embodiment, Z10 area may determine the area capable of covering the BVM view designed by the left and right cameras 101-2 and 101-3 as much as possible from the original image of the rear camera 101-4.

Figure 11:
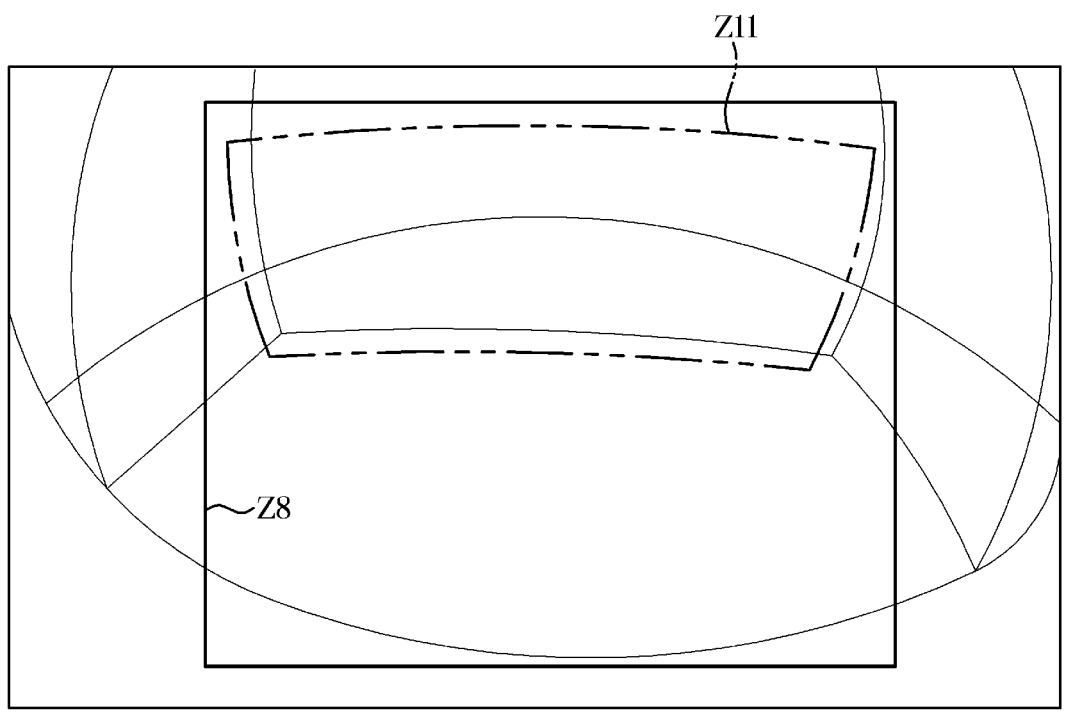

Referring to FIG. 11, the user sets a Zn area as the area of interest, and the controller 105 may determine the exposure value of the camera based on the brightness of the Zn area. According to the embodiment, Zn area may be determined as the area of the range of the actual rear view from the general rear view illustrated in FIG. 8 to the rear mirror view. According to the embodiment, it may be determined to be seen from the rear of about 1.5 m from the bumper of the vehicle 1.

Meanwhile, the controller 105 may designate one of the images around the vehicle 1 obtained by the rear camera described in FIGS. 8 to 11 as the area of interest by the user, and change the exposure value of the camera based on the brightness information of the corresponding area of interest.

FIGS. 8 to 11 are merely examples for explaining the operation of inputting the area of interest by the user, and there is no limitation on the operation of determining the area of interest from the images around the vehicle 1 obtained by the camera.

Figure 12:
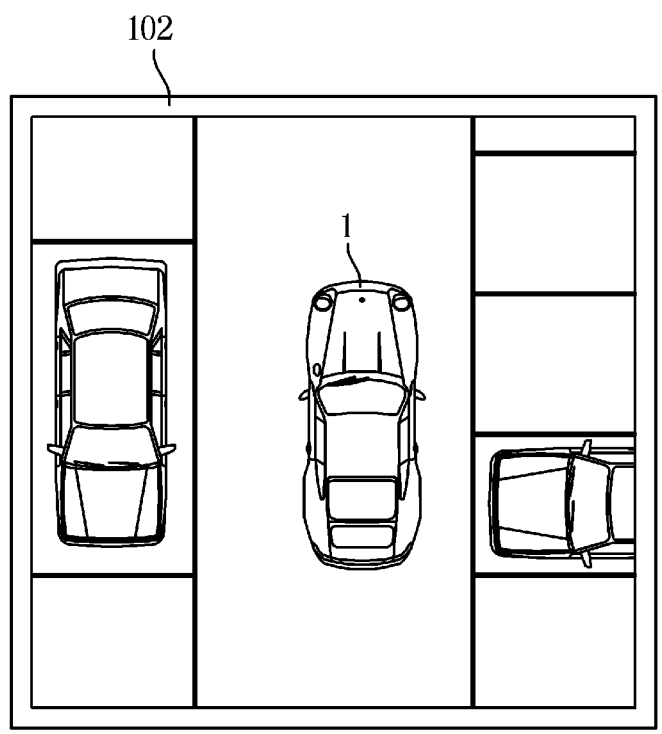
FIG. 12 is a view for explaining an operation of applying an exposure value of a reference camera according to an embodiment to another camera.

FIG. 12 is a view for explaining an operation of applying an exposure value of a reference camera according to an embodiment to another camera.

Referring to FIG. 12, the output image formed based on the image around the vehicle 1 obtained by at least one camera provided in the vehicle 1 is illustrated. The display image illustrated in FIG. 12 may form the SVM top view image. Meanwhile, when the user operates or proceeds the steering wheel to park to the right in the situation of the vehicle 1 in FIG. 12, or selects the right area as the area of interest, the controller 105 may determine the right camera as the reference camera. The controller 105 may determine the exposure value based on the brightness information of the image around the vehicle 1 obtained by the right camera and apply the corresponding exposure value to another camera.

Meanwhile, according to another embodiment, when the user operates or proceeds to handle the left side in the situation of the vehicle 1 in FIG. 12, or selects the left side area as the region of interest, the controller 105 may determine the left side camera as the reference camera. The controller 105 may determine the exposure value based on the brightness information of the image around the vehicle 1 obtained by the left camera and apply the corresponding exposure value to another camera.

Meanwhile, FIG. 12 is merely an example of forming the SVM top view according to the embodiment, and there is no limitation on the embodiment in which the exposure value is determined by the camera and the corresponding exposure value is applied to another camera.

Figure 13:
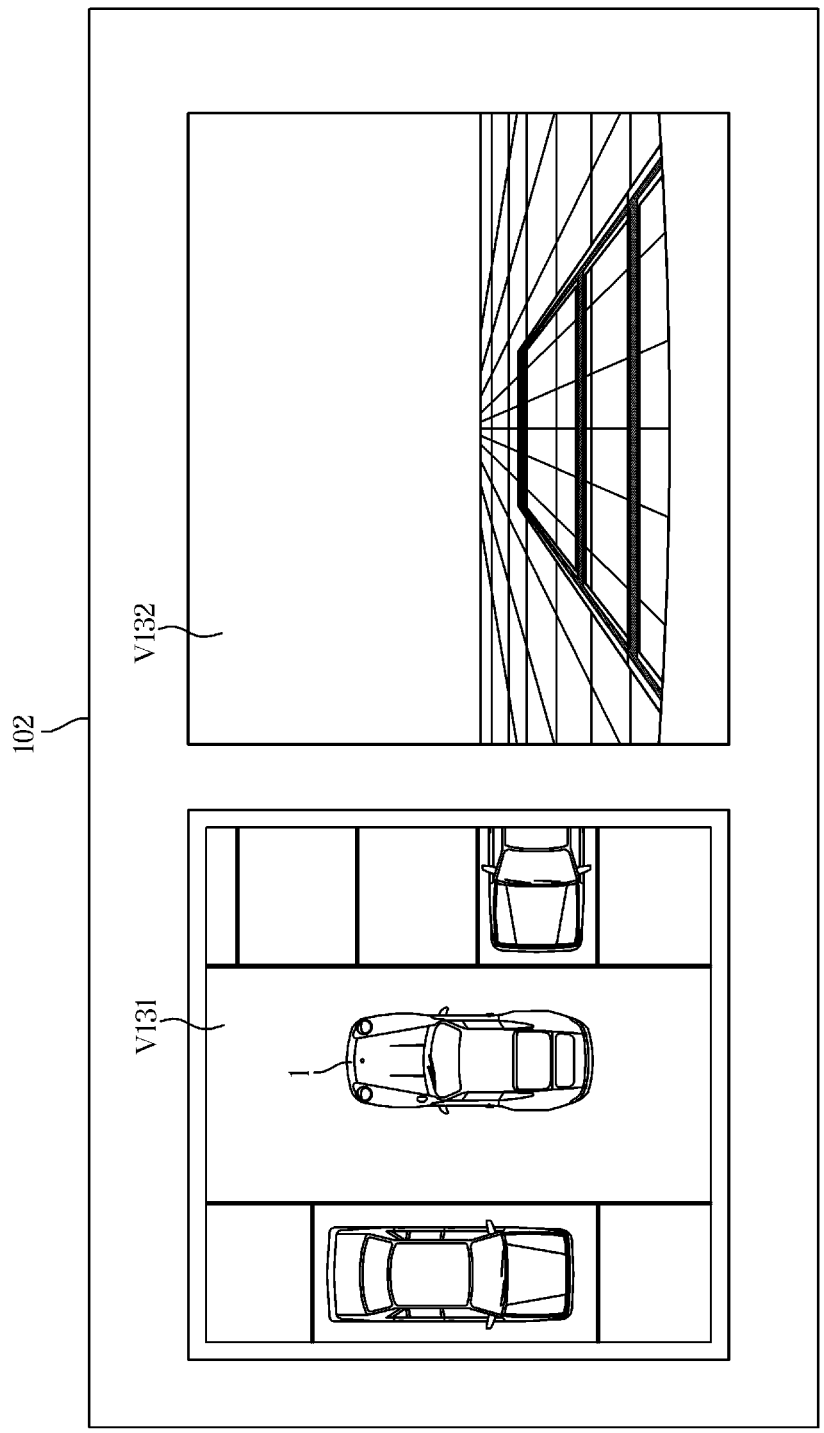
FIG. 13 is a view for explaining operations when a plurality of output images is generated according to an embodiment.

FIG. 13 is a view for explaining operations when a plurality of output images is generated according to an embodiment.

Referring to FIG. 13, the display 102 may display two output images V131 and V132.

According to the embodiment, the display 102 may simultaneously output the SVM top view and the image corresponding to the display mode based on the user's command. FIG. 13 illustrates that the rear image V132 of the vehicle 1 obtained by the rear camera based on the SVM top view and the input command of the user is displayed. The user may input the command so that the rear image is displayed on the display 102 through the button or the like provided in the vehicle 1.

In this case, the priority of the rear image V132 of the vehicle 1 in which the user intends to see may be determined higher than that of the SVM top view V131. Accordingly, the image output to the rear image V132 may be determined as the reference output image to determine the exposure value and the SVM top view V131 output on the right side may be derived based on the camera to which the controlled exposure value is applied on the left screen.

According to another embodiment, the SVM top view may be output to the AVN display 102-2, and the BVM view may be simultaneously output to the cluster 102-1.

Since the SVM top view is intended for the driver or the passenger to always check the surroundings and the BVM is for the purpose of confirming for the driver to intervene and change the lane, the controller 105 may determine the priority of the BVM view to be higher than the priority of the SVM view. Therefore, the exposure value may be determined based on the brightness information of the BVM view, and the exposure of the SVM top view may be changed based on the determined exposure value.

According to another embodiment, the SVM top view may be output to a rear monitor, and a BVM view may be simultaneously output to the cluster 102-1.

Since the SVM top view is intended for the passenger in the rear seat to always check the surroundings and the BVM is for the purpose of confirming for the driver to intervene and change the lane, the controller 105 may determine the priority of the BVM view to be high.

The controller 105 may determine the exposure value based on the brightness information of the BVM view and change the exposure of the SVM top view based on the determined exposure value.

However, the operation of determining the priority described in FIG. 13 is only the embodiment for explaining the operation of the present disclosure, and the type and priority of each image may be arbitrarily determined.

Figure 14:
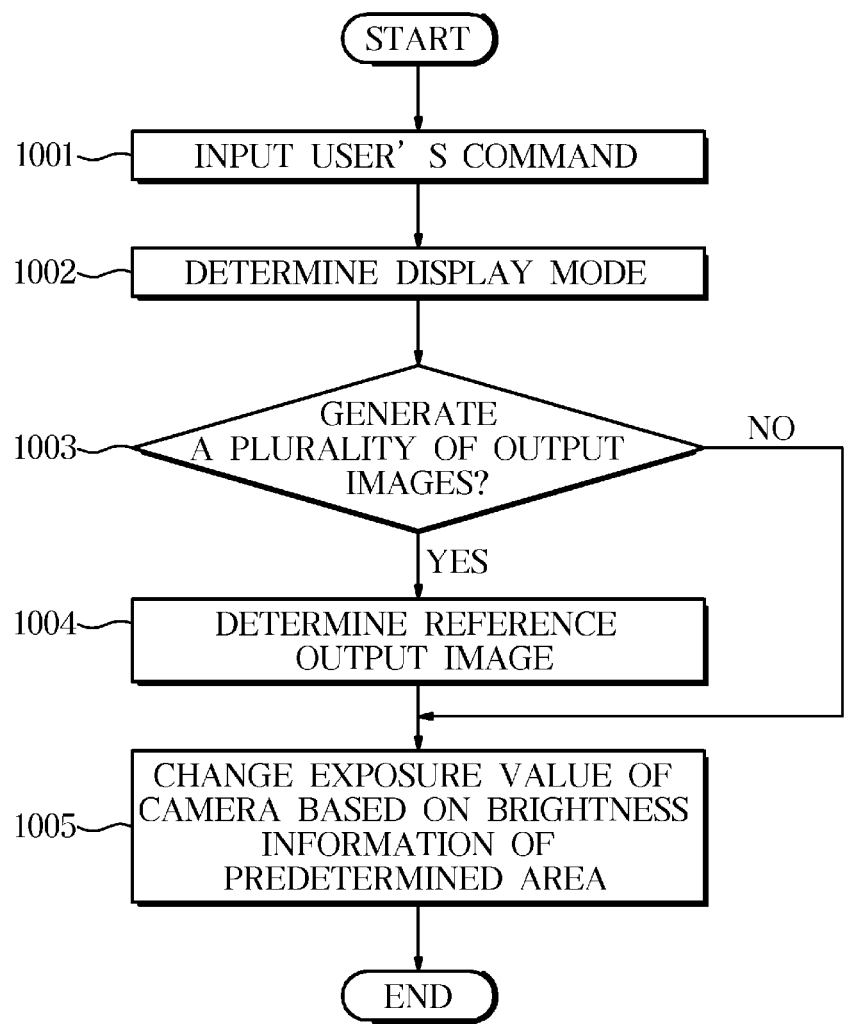
FIG. 14 is a flowchart according to an embodiment.

FIG. 14 is a flowchart according to an embodiment.

Referring to FIG. 14, the user may input a command through the inputter 103 (1001). The controller 105 may determine the display mode based on the user's command (1002). Meanwhile, when the corresponding display mode generates the plurality of output images (1003), the controller 105 may determine the reference output image for determining the exposure value among the plurality of output images. In this case, the reference output image may correspond to the predetermined area. Meanwhile, when the controller 105 does not generate the plurality of output images, the controller 105 may change the exposure value of the camera based on the brightness information of the predetermined area corresponding to the display mode (1005).

As is apparent from the above description, the embodiments of the present disclosure may determine the exposure value of the camera in accordance with the user's intention and provide the image obtained with the determined exposure value to the user, thereby clearly grasping the environment around the vehicle.

Meanwhile, the embodiments of the present disclosure may be implemented in the form of recording media for storing instructions to be carried out by a computer. The instructions may be stored in the form of program codes, and when executed by a processor, may generate program modules to perform an operation in the embodiments of the present disclosure. The recording media may correspond to computer-readable recording media.

The computer-readable recording medium includes any type of recording medium having data stored thereon that may be thereafter read by a computer. For example, it may be a Read Only Memory (ROM), a Random Access Memory (RAM), a magnetic tape, a magnetic disk, a flash memory, an optical data storage device, and the like.

The exemplary embodiments of the present disclosure have thus far been described with reference to accompanying drawings. It will be obvious to those of ordinary skill in the art that the present disclosure may be practiced in other forms than the exemplary embodiments as described above without changing the technical idea or essential features of the present disclosure. The above exemplary embodiments are only by way of example, and should not be interpreted in a limited sense.

What is claimed is:

1. A vehicle comprising:
a plurality of cameras configured to obtain images around the vehicle;
a display configured to display an output image from one or more of the cameras based on the images around the vehicle;
an input device configured to receive a user's command;
a memory storing an algorithm; and
a processor coupled to the memory and configured to execute the algorithm to determine a display mode of the output image to be displayed based on the user's command, to determine a reference area in the images or portions of the images around the vehicle based on the display mode, and to change an exposure value of the one or more of the cameras based on brightness information of the determined reference area corresponding to the display mode so that the determined reference area determines the exposure value of the one or more of the cameras used to display the output image, wherein the reference area is different than the output image to be displayed.

2. The vehicle according to claim 1, wherein the processor is configured to execute the algorithm to determine at least one image among the images around the vehicle obtained by the plurality of cameras as the determined reference area to change an exposure value of the plurality of cameras.

3. The vehicle according to claim 2, wherein the processor is configured to execute the algorithm to apply the exposure value of a reference camera that has obtained the determined reference area among the plurality of cameras to another camera.

4. The vehicle according to claim 1, wherein the processor is configured to execute the algorithm to change the exposure value of the camera based on the brightness information of an area of interest determined by the user's command.

5. The vehicle according to claim 1, wherein the processor is configured to execute the algorithm to generate a plurality of output images based on the images around the vehicle, to determine a reference output image among the plurality of output images based on a predetermined priority, and to change the exposure value of the camera based on the brightness information of the determined reference area corresponding to the reference output image.

6. The vehicle according to claim 1, further comprising a sensor configured to obtain state information of the vehicle, wherein the processor is configured to execute the algorithm to determine the display mode of the output image based on the user's command and the state information of the vehicle.

7. The vehicle according to claim 1, wherein the processor is configured to execute the algorithm to determine the display mode by choosing a display mode that may include a surround view monitor top view, a blind-spot view monitor view, a rear base view, a rear wide view, a front fender view, a foreground view, or a rear mirror view.

8. The vehicle according to claim 1, wherein the processor is configured to execute the algorithm to change an exposure value of the camera based on brightness information by causing an aperture size and a shutter speed of the camera according to the brightness of the image around the vehicle.

9. The vehicle according to claim 1, wherein the determined reference area is based on only a portion of the image, the portion being determined based on the user's command.

10. A method for controlling a vehicle, the method comprising:
obtaining images around the vehicle using a plurality of cameras;
receiving a user command;
determining a display mode of an image to be displayed based on the user command, the image to be displayed being obtained by one or more of the cameras;
determining an area of interest in the obtained images around the vehicle based on the user command, the area of interest being different than the image to be displayed;
changing an exposure value of the camera based on brightness information of the determined area of interest; and
displaying the image to be displayed so that the image is displayed with the exposure value of the camera being based on the brightness information of the area of interest that is different than an area of the image.

11. The method according to claim 10, wherein determining the area of interest comprises determining at least one image among the images around the vehicle obtained by the cameras as the determined area of interest to change the exposure value of the plurality of cameras.

12. The method according to claim 11, wherein changing the exposure value of the camera comprises applying the exposure value of a reference camera that has obtained the determined area of interest among the plurality of cameras to another camera.

13. The method according to claim 10, further comprising generating a plurality of output images based on the images around the vehicle.

14. The method according to claim 13, wherein changing the exposure value of the camera comprises:
determining a reference output image among the plurality of output images based on a predetermined priority; and
changing the exposure value of the camera based on the brightness information of the determined area corresponding to the reference output image.

15. The method according to claim 10, further comprising obtaining state information of the vehicle, wherein changing the exposure value of the camera comprises changing the exposure value of the camera based on brightness information of the determined area of interest and the state information of the vehicle.

16. The method according to claim 11, further comprising obtaining state information of the vehicle, wherein changing the exposure value of the camera comprises changing the exposure value of the camera based on brightness information of the determined area of interest and the state information of the vehicle.

17. A method for controlling a vehicle, the method comprising:
obtaining images around the vehicle, the images obtained by at least one camera;
receiving a user command;
determining a display mode based on the user command, the display mode indicating simultaneous viewing of different views from outside the vehicle;
determining a reference area in the images around the vehicle, the reference area determined by one of the different views that has a highest priority;
changing an exposure value of the at least one camera based on brightness information of the determined reference area; and
simultaneously displaying the different views indicated by the display mode.

18. The method according to claim 17, wherein the at least one camera comprises a plurality of cameras.

19. The method according to claim 18, wherein the different views comprise views taken from a group consisting of a surround view monitor top view, a blind-spot view monitor view, a rear base view, a rear wide view, a front fender view, a foreground view, and a rear mirror view.

20. The method according to claim 17, wherein the different views comprise views taken from a group consisting of a surround view monitor top view, a blind-spot view monitor view, a rear base view, a rear wide view, a front fender view, a foreground view, and a rear mirror view.

* * * * *